US006874464B2

(12) United States Patent
Montgomery

(10) Patent No.: US 6,874,464 B2
(45) Date of Patent: Apr. 5, 2005

(54) SYSTEM AND METHOD TO DETECT AND CORRECT SPARK PLUG FOULING IN A MARINE ENGINE

(75) Inventor: David T. Montgomery, Pleasant Prairie, WI (US)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 10/605,710

(22) Filed: Oct. 21, 2003

(65) Prior Publication Data

US 2005/0022776 A1 Feb. 3, 2005

Related U.S. Application Data

(60) Provisional application No. 60/481,168, filed on Aug. 1, 2003.

(51) Int. Cl.[7] .......................... F02P 17/12; G01M 19/02

(52) U.S. Cl. .................. 123/295; 123/406.14; 324/399

(58) Field of Search ........................... 123/295, 406.12, 123/406.14, 630; 324/393, 399

(56) References Cited

U.S. PATENT DOCUMENTS 5,777,216 A * 7/1998 Van Duyne et al. ........ 324/399
5,924,404 A * 7/1999 Ruman et al. ......... 123/406.18
6,314,939 B1 11/2001 Koerner et al. ............. 123/430
6,505,605 B2 * 1/2003 Yamada et al. ........ 123/406.14
6,741,080 B2 * 5/2004 Peterson et al. ............ 324/399

* cited by examiner

*Primary Examiner*—Tony M. Argenbright
(74) *Attorney, Agent, or Firm*—BRP Legal Services

(57) ABSTRACT

A system and method for operating a combustion engine including a combustion chamber operable in at least a first operating mode and second operating mode. An engine control unit (ECU) performs conductivity sensing within the combustion chamber and interprets the results. Specifically, the ECU determines the current between a pair of spark plug electrodes placed within a combustion chamber of a combustion engine prior to, or after, combustion. The ECU determines whether the current between the pair of electrodes is indicative of spark plug fouling. If spark plug fouling is determined, the ECU can modify the mode of operation to correct the spark plug fouling and clean the deposits on the spark plug while the engine is in operation and without operation intervention.

29 Claims, 2 Drawing Sheets

SYSTEM AND METHOD TO DETECT AND CORRECT SPARK PLUG FOULING IN A MARINE ENGINE

CROSS REFERENCE TO RELATED APPLICATIONS

The present invention claims the benefit of U.S. Ser. No. 60/481,168 filed Aug. 1, 2003.

BACKGROUND OF INVENTION

The present invention relates generally to internal combustion engines, and more particularly, to a system and method of detecting spark plug fouling and switching an operation mode of the internal combustion engine to correct any spark plug fouling that is detected.

In general, fuel-injected engines include a fuel injector that provides a fine mist of fuel that mixes with combustion generating gases, that generally comprise a mixture of fresh air and any remaining exhaust gases. Ideally, this mixture is compressed and spark ignited. The spark ignition is typically provided by a spark plug. The spark plug is essentially a pair of electrodes disposed within a combustion chamber and separated by an air gap. One spark plug electrode is connected to an intermittent voltage potential and the other is connected to an electrical ground. When a sufficient voltage potential is present at one electrode, a spark occurs across the air gap.

Certain fuel-injected internal combustion engines have been refined to operate in two combustion modes that can be defined as a stratified operation and a homogenous operation. When the engine is operating at low speeds and/or loads, a stratified operation is generally preferred, wherein fuel is introduced into the combustion chamber and spark ignited on injection. In contrast, when the engine is operating at higher engine speeds and/or loads, a homogenous operation is preferred, wherein fuel is allowed to hit the piston and intermix more thoroughly with the combustion gases before ignition. Therefore, the homogenous combustion mode is characterized by a generally uniform and relatively rich fuel charge in the combustion chamber. On the other hand, a stratified operating mode is characterized by fluctuations in the fuel and gas mix, or equivalence ratio. Engines that operate in homogeneous and stratified modes must be calibrated to switch between cylinders either individually or all at once from stratified to homogeneous when transitioning to higher speeds and from homogeneous to stratified when transitioning from high speed to low speed. The present invention is particularly applicable in engines that transition cylinders individually. However, it is contemplated that the present invention is also applicable in systems that transition all cylinders together.

Stratified combustion can include an air/fuel mixture having mainly a lean mixture about a periphery of the combustion chamber surrounding a relatively small layer or pocket of rich mixture near a center of the combustion chamber. In one mode, the rich mixture is initially ignited by firing a spark into the combustion chamber early in the combustion cycle wherein the ignition spreads to the leaner mixture consuming the rest of the leaner mixture in the combustion chamber. Therefore, unlike operating under homogeneous condition, when operating under stratified conditions, the spark plug fires while the injected fuel has yet to reach the piston and evenly disperse. As such, when operating the engine in a stratified operation mode, soot can develop in the combustion chamber from the direct ignition of unvaporized fuel.

Additionally, other operating modes are also known to cause soot production in the combustion chamber. For example, if the engine is operating in an incorrect heat range or operating with an incorrect air/fuel mixture, soot may also be formed within the combustion chamber.

Over time, the buildup of soot deposited on the electrodes of the spark plug can interfere with the spark across the electrodes. That is, rather than causing a clean, well defined spark across the air gap, the voltage potential can be discharged, or partially dissipated, via the soot buildup. This buildup of soot, known as spark plug fouling, can cause the engine to misfire. The result is a loss of power provided by the engine.

The detection of spark plug fouling generally requires an inspection of the spark plug. Such an inspection requires that engine operation cease and the spark plugs be removed. Furthermore, to correct spark plug fouling, the spark plugs must be manually cleaned or replaced. The operating parameters of the engine must then be augmented incrementally until spark plug fouling ceases.

Such an inspection and correction process not only requires that the engine be taken out of operation, but with the advanced nature of current engines, may also require the mechanical proficiency of trained service personnel. It would therefore be desirable to have a system and method to automatically detect and correct spark plug fouling in a combustion engine while the engine is in operation.

BRIEF DESCRIPTION OF INVENTION

The present invention provides a system and method to detect and correct spark plug fouling that overcomes the aforementioned drawbacks. An engine control unit (ECU) performs ion gap sensing within the combustion chamber and interprets the results. Specifically, the ECU determines the current between a pair of electrodes within a combustion chamber of a combustion engine prior to, or after, combustion. In a preferred embodiment, the pair of electrodes are spark plug electrodes. The ECU then determines whether the current between the spark plug electrodes is indicative of spark plug fouling. If spark plug fouling is determined, the ECU can modify the mode of operation to correct the spark plug fouling and clean the deposits on the spark plug while the engine is in operation and without operator intervention.

In accordance with one aspect of the current invention, a system for operating a combustion engine includes a combustion engine having at least one combustion chamber operable in at least a first operating mode and second operating mode and a pair of electrodes disposed within the combustion chamber used as a spark plug. An ECU is configured to monitor conductivity between the spark plug electrodes and determine spark plug fouling therefrom.

In accordance with another aspect of the current invention, a method of controlling engine operation includes operating a combustion engine in a first operation mode and determining a conductivity between of the spark plug electrodes within a combustion chamber of the combustion engine during a period of low ionization. The method includes, switching a mode of operating the combustion chamber if the conductivity between the spark plug electrodes is indicative of spark plug fouling.

In accordance with another aspect of the current invention an outboard motor includes a powerhead having a combustion engine, a midsection configured for mounting the outboard motor to a watercraft, and a lower unit powered by the engine to propel the watercraft. The combustion engine has a first electrode and a second electrode operationally disposed therein. The outboard motor also includes a computer configured to detect and correct spark plug fouling by supplying a current to the first electrode and monitoring the flow of current to the second electrode during a low ionization period within the combustion chamber and modifying combustion in response thereto.

In accordance with yet another aspect of the current invention a system for determining spark plug fouling includes a means for detecting spark plug fouling and a means for correcting any detected fouled spark plug.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
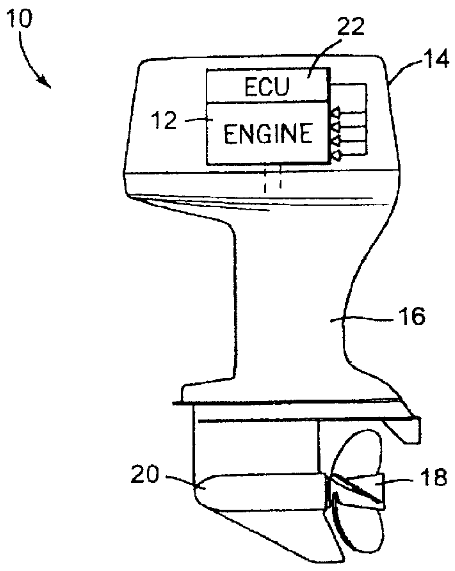
FIG. 1 is an outboard marine motor incorporating the present invention.

The present invention relates to internal combustion engines, and preferably, those incorporating direct fuel injection in a spark-ignited gasoline-type engine. In a preferred embodiment, the engine is a two-stroke injection engine. FIG. 1 shows an outboard motor 10 having one such engine 12. The engine 12 is housed in a powerhead 14 and supported on a mid-section 16 configured for mounting on the transom of a boat (not shown) in a known conventional manner. An output shaft of the engine 12 is coupled to a drive propeller 18 extending rearwardly of a lower gearcase 20 via the mid-section 16. The engine 12 is controlled by an electronic control unit (ECU) 22. While the present invention is shown in FIG. 1 as being incorporated into an outboard motor, the present invention is equally applicable with many other engine applications such as inboard motors, motorcycles, scooters, snowmobiles, personal watercrafts, all-terrain vehicles, lawn maintenance equipment, etc.

Figure 2:
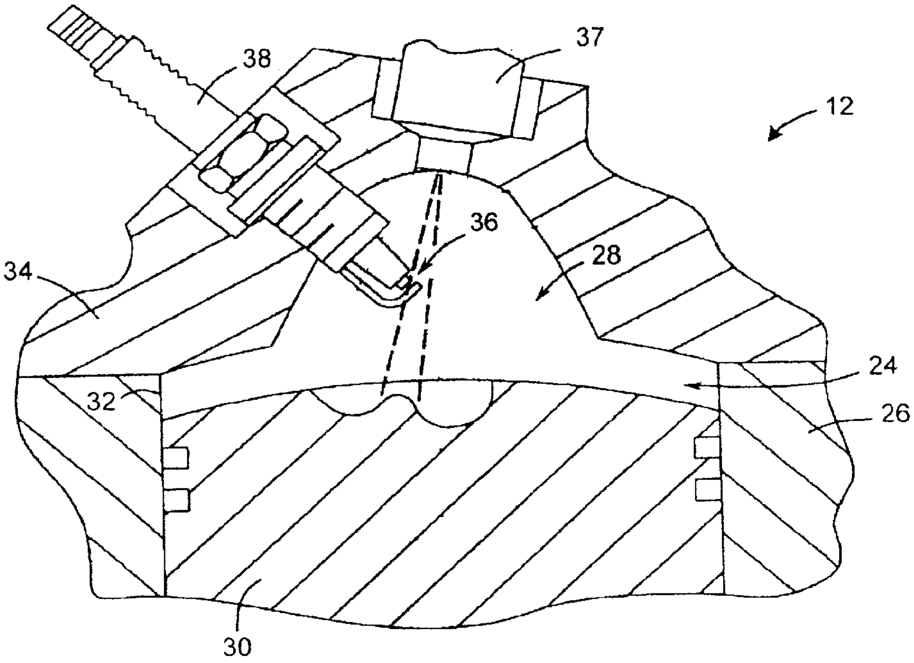
FIG. 2 is a cross-sectional view of an engine cylinder of an engine shown in FIG. 1 incorporating the present invention.

Referring to FIG. 2, an exemplary individual engine cylinder 24 of engine 12 is shown in cross-section. The cylinder 24 is formed in an engine block 26. A combustion chamber 28 is located in an upper portion of the cylinder 24. The combustion chamber 28 is defined as the space contained between a piston 30, a cylinder wall 32, and a cylinder head 34 mounted on the engine block 26. Disposed within the cylinder head 34 are a fuel injector 37 and a spark plug 38. As will be further described, the fuel injector 37 is position to inject fuel into the combustion chamber 28 whereby a pair of electrodes 36 of the spark plug 38 is positioned within the combustion chamber to ignite the fuel. The piston 30 reciprocates in cylinder 24 thereby changing the volume of the combustion chamber 28.

When the piston 30 is at top-dead-center (TDC), the volume of the combustion chamber 28 is at a minimum. The piston 30 is then drawn downward, expanding the combustion chamber, during a power stroke. At a distance from TDC, the piston 30 moves below an exhaust port and intake port (not shown) whereby the exhaust port and intake port are opened so that exhaust, generated by combustion, can exit the combustion chamber 28 and a fresh charge of air from the crankcase (not shown) can enter the combustion chamber 28. The piston 30 then reaches its lowest point, bottom-dead-center (BDC), and reciprocates back toward TDC.

At a predetermined time during the travel of the piston 30 from BDC to TDC, and dependent upon a specific mode of operation, the fuel injector 37 injects a quantity of fuel into the combustion chamber 28. Once the fuel is injected, the spark plug 38 is energized with a voltage potential between the electrodes 36, which causes a spark to fire between the electrodes 36 to ignite the fuel. The timing of the ignition spark is also dependent upon an operation mode. For example, when the operation mode is a stratified operation mode, the fuel is injected when the piston 30 is near TDC and the fuel is ignited immediately following injection. The result is an operation mode that is desirable when the engine is operating at low speeds or loads. However, when operating in the stratified operation mode, soot can be generated within the combustion chamber. Soot generally is formed from incomplete combustion, such as when the ignition timing of a combustion chamber 28 is too early or too late. Some examples of operating conditions that can produce soot are when the engine is not operating within a correct temperature range, the fuel mixture is incorrect for a particular speed and/or load. This soot is deposited on the electrodes 36 of the spark plug 38 and, over time, a path of lowered resistance between the electrodes 36 is created by the layer of soot. If the layer of soot is great enough, the current induced by the voltage potential passes across the soot rather than as a spark between the pair of electrodes 36.

Figure 3:
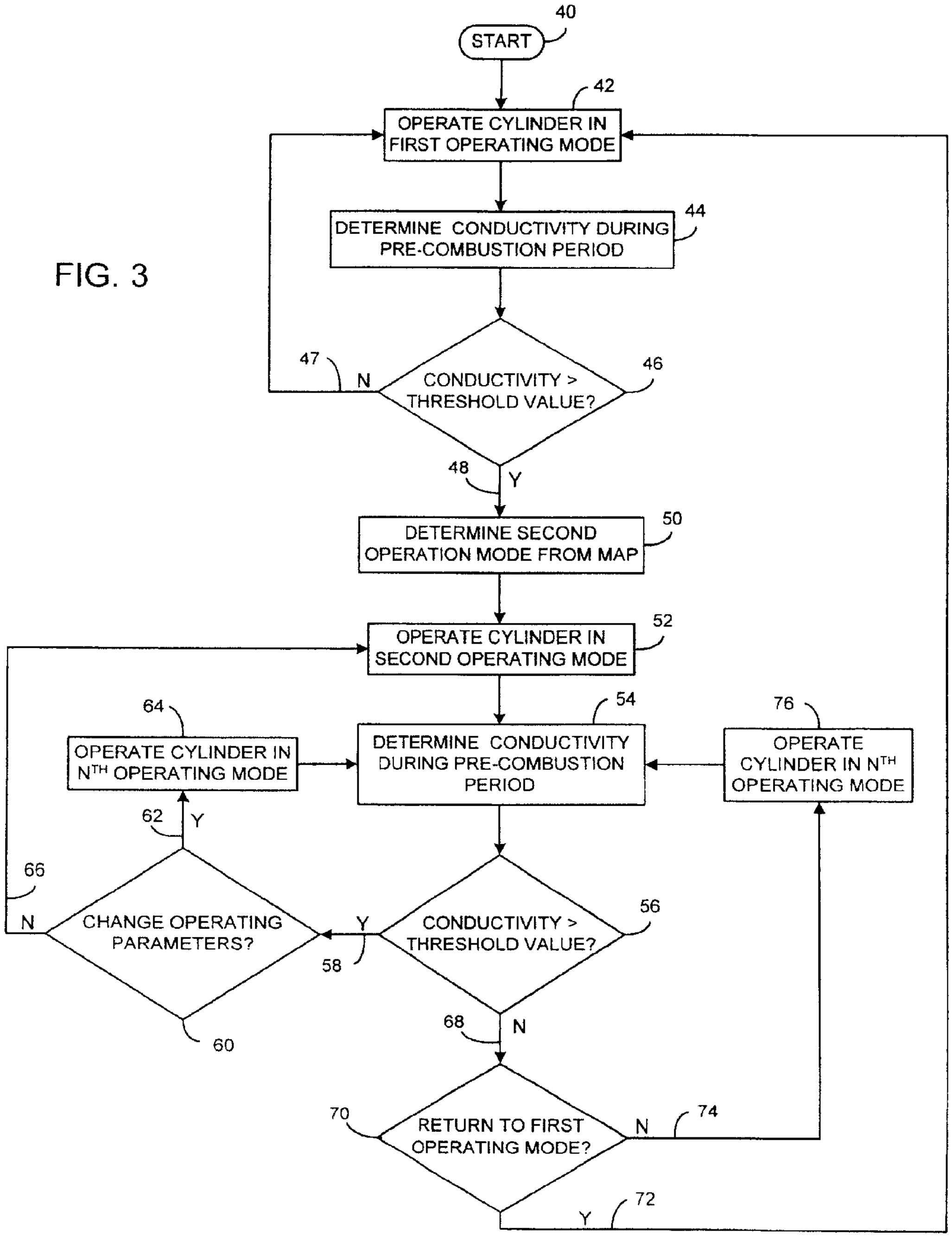
FIG. 3 is a flow chart setting forth the steps of a process for determining and correcting spark plug fouling within the engine shown in FIG. 1.

To counter the effects of spark plug fouling, during the ignition cycle, the ECU 22 of FIG. 1, includes a map stored in memory to control the operation of the engine. The ECU includes a computer that is programmed in accordance with that shown in FIG. 3. The ECU 22 causes the engine 12 to begin operation 40, FIG. 3, in a first operating mode 42. At a predetermined piston position, the ECU energizes a pair of electrodes, separated by an air gap within the combustion chamber, with a voltage potential and determines a pre-combustion current induced by the voltage potential 44. In a preferred embodiment, the pair of electrodes energized by the ECU 22 is a pair of electrodes 36 of the spark plug 38 of FIG. 2. However, it is contemplated that the pair of electrodes energized by the ECU for ionization gap sensing may be an auxiliary pair of electrodes (now shown) separate from the pair of electrodes 36 of the spark plug 28.

"Pre-combustion" is defined as a time before combustion and preferably beginning when exhaust from combustion has been removed from the combustion chamber but prior to any subsequent combustion, preferably near BDC.

For example, in a preferred embodiment, the pre-combustion current is determined during a scavenging period. The scavenging period occurs when intake and exhaust ports in the combustion chamber are simultaneously open due to the movement of the piston. As such, the exhaust from combustion is removed from the combustion chamber via the exhaust port and fresh air is pulled into the combustion chamber from the crankcase via the intake port. Therefore, one of skill in the art will readily recognize that the term "post-combustion" may also be used to describe a period when exhaust from combustion is being or has been removed from the combustion chamber but prior to a subsequent combustion. Simply, one of ordinary skill will readily recognize that the scavenging period may be considered to be pre-combustion or post-combustion. In any case, one skilled in the art will recognize that spark plug fouling can be detected at various times in the cycle if certain thresholds are used. For simplicity, the period when exhaust from combustion has been removed from the combustion chamber, or nearly so, but prior to any subsequent combustion will be referred to as pre-combustion.

To determine pre-combustion current, current sensing is implemented to determine the conductivity of soot deposits between the electrodes. Current sensing is accomplished by placing a voltage potential across the electrodes and measuring the current that flows between the electrodes at some point when the combustion chamber has little ionization from combustion. Under a voltage potential, the current that flows between the electrodes is proportional to the conductivity between the electrodes. The conductivity between the electrodes can either be indicative of the ionization of the combustion gas because ions are responsible for the transportation of the charge across the gap between the electrodes or the conductivity can be indicative of conductive soot deposits fouling the spark plug. However, since the conductivity sensing occurs during a pre-combustion period when in the presence of mostly fresh air, that has not yet been exposed to combustion, the ion concentration is relatively low. The presence of a small amount of exhaust gases still in the combustion chamber will improve the conductivity of the fresh air; however, the ion concentration is still relatively low. As such, when the voltage potential is applied to the electrodes, a relatively low current flow could be induced and flow across the gap to the grounded electrode.

If the electrodes contain too much soot, indicating that the spark plug is fouling or has fouled, the discharge of the voltage potential will not be across the gap via ions, but the discharge will be directly to the grounded electrode via the deposited soot. As a result, the current detected from one electrode to the other electrode will be significantly higher than detected when the spark plug is not fouling or fouled.

Referring again to FIG. 3, the ECU then compares the current induced by the voltage potential between the electrodes to a threshold value 46. The threshold value is indicative of spark plug fouling. Accordingly, if the conductivity identified by the current induced between the electrodes is less than the threshold value 47, any soot present on the spark plug is not affecting running conditions and combustion is determined to be normal. In this case, the ECU permits the combustion chamber containing that set of electrodes to continue normal operation in the first operation mode 47, 42.

On the other hand, if the conductivity identified by the current induced between the electrodes is greater than the threshold value 46, that spark plug is deemed to be fouling or in a fouled state 46, 48.

In accordance with one embodiment, the ECU determines the appropriate operating parameters to change according to a map 50 stored in the ECU. The map dictates the operating parameters that should be changed based upon the first operating mode and the level of current determined by the ECU at 44 that is, the amount of fouling on the spark plug. For example, if the first operating mode is characterized by a stratified operating mode and the level of current determined at 44 is sufficiently greater than the threshold value at 46, the ECU may cause the engine to switch from the stratified operating mode to a homogeneous operating mode, or some other, second operating mode.

On the other hand, under some conditions, the map may dictate that a less significant change is sufficient to stop and ultimately correct the spark plug fouling and the change in operating mode may only constitute a minor change to an operating parameter. As such, a single operating parameter, such as throttle position, ignition timing, fuel mixture, etc., may be changed. Once complete, the ECU may continue to monitor the conductivity between the electrodes to determine if the change in operating parameter has remedied the fouling. It is also contemplated that the ECU determine operating conditions on-the-fly without the use of a map. Under this scenario, the ECU is free to calculate real-time settings.

Furthermore, it is contemplated that upon changing an operating mode of one combustion chamber which is experiencing fouling, the ECU may change an operating mode of a second combustion chamber to operate as the first combustion chamber had, prior to the change in operating mode. As such, the net effect on engine operation is minimized to the user. In other words, the cleaning process is completely transparent to the equipment operator.

In any case, once the engine is operating in the second operating mode 52, the ECU continues to monitor the conductivity between the electrodes during a pre-combustion period 54. Again, in a preferred embodiment, the pre-combustion period is the scavenging period so that post-combustion exhaust gases that contain a higher concentration of ions have mostly been removed when current sensing occurs at 54. After current sensing is complete, the conductivity between the electrodes is again compared to the threshold value 56. If the conductivity remains greater than the threshold value 58, the ECU determines whether a subsequent operating parameter must be augmented 60, 64 in order to remove the soot deposited on the electrodes and remedy the spark plug fouling. That is, if it is determined that spark plug fouling has continued 56, 58, and that additional changes are needed 60, 62, the ECU causes the engine to change additional operating parameters characterizing a third (or $n^{th}$) operating mode 64. For example, if the spark plug fouling continues after the operating parameter has been changed 56, 58, the ECU may change the fuel-to-air mixture within the combustion chamber, change the ignition timing, or attempt to lower the operating temperature of the engine. This process of incremental adjustments to operating parameters may continue until the determination is made that the conductivity is lower than the threshold value 56, 68. On the other hand, if the fouling is still present 56, 58 but is beginning to subside such that no additional changes are deemed necessary 60, 66, the engine is allowed to continue cleaning operation in the $n^{th}$ operation mode 52.

Once the conductivity between the electrodes is less than the threshold value 56, 68, the ECU determines whether to return operation of that combustion chamber to the first operating mode 70, 72. If the engine conditions, dictate that the cylinder should return to the first operating mode 70, 72, the ECU returns the operating parameters to the first, original operating mode 42 and operation under those parameters is permitted to continue 46, 47 unless spark plug fouling is again detected 46, 48. However, if the ECU determines that the cylinder should not return to the first operating mode 70, 74, but determines some other mode is appropriate for the circumstances, the cylinder is run in some $n^{th}$ operation mode 76. A technique to detect and remedy spark plug fouling is thereby achieved.

It is contemplated that the above-described technique can be embodied in a system for operating a combustion engine including a combustion engine having at least one combustion chamber operable in at least a first operating mode and second operating mode and a pair of electrodes disposed within the combustion chamber. An ECU is configured to monitor conductivity between the pair of electrodes and determine spark plug fouling therefrom.

Additionally, it is contemplated that the above-described technique be embodied as a method of controlling engine operation including operating a combustion engine in a first operation mode and determining a conductivity between a pair of electrodes within a combustion chamber of the combustion engine during a period of low ionization. The method includes, switching a mode of operating the combustion chamber if the conductivity between the pair of electrodes is indicative of spark plug fouling.

It is also contemplated that the above-described technique may be embodied in an outboard motor that includes a powerhead having a combustion engine, a mid-section configured for mounting the outboard motor to a watercraft, and a lower unit powered by the engine to propel the watercraft. The combustion engine has a first electrode and a second electrode operationally disposed therein. The outboard motor also includes a computer configured to detect spark plug fouling by supplying a current to the first electrode and monitoring the flow of current to the second electrode during a low ionization period within the combustion chamber.

It is additionally contemplated that the above-described technique be embodied in a system for determining spark plug fouling includes a means for detecting spark plug fouling and a means for correcting any detected fouled spark plug.

The present invention has been described in terms of the preferred embodiment, and it is recognized that equivalents, alternatives, and modifications, aside from those expressly stated, are possible and within the scope of the appending claims.

What is claimed is:

1. A system for operating a combustion engine, the system comprising:

- a combustion engine having at least one combustion chamber operable in at least a first operating mode and a second operating mode;
- a pair of electrodes disposed within the at least one combustion chamber; and
- an engine control unit (ECU) configured to monitor conductivity between the pair of electrodes and determine spark plug fouling therefrom,
- once the ECU has determined spark plug fouling, the ECU controls combustion in the at least one combustion chamber based on the conductivity monitored.

2. The system of claim 1 wherein the ECU is further configured to determine conductivity between the electrodes during a scavenging period.

3. The system of claim 1 wherein the pair of electrodes is a pair of spark plug electrodes.

4. The system of claim 1 incorporated into one of an outboard motor, a stern drive engine, an inboard engine, a motorcycle engine, a scooter engine, an all terrain vehicle engine, a snowmobile engine, and a lawn equipment engine.

5. The system of claim 1 wherein the ECU is further configured to control combustion in the at least one combustion chamber and to switch an operation mode of the at least one combustion chamber from a first operating mode to a second operating mode if spark plug fouling is determined.

6. The system of claim 5 wherein the ECU is further configured to simultaneously switch an operation mode of at least one other combustion chamber from the second operating mode to the first operating mode if spark plug fouling is determined in the at least one combustion chamber.

7. The system of claim 5 wherein the ECU is further configured to selectively operate the at least one combustion chamber and at least one other combustion chamber in the first operating mode and the second operating mode independently.

8. The system of claim 5 wherein the first operating mode has a fluctuating fuel-to-air mixture and the second operating mode has a substantially constant fuel-to-air mixture.

9. The system of claim 1 wherein the ECU is further configured to compare the monitored conductivity to a threshold conductivity indicative of spark plug fouling and operate the at least one combustion chamber in the second operating mode if the monitored conductivity is greater than the threshold conductivity.

10. The system of claim 5 wherein the first operating mode is a stratified operating mode and the second operating mode is a homogeneous operating mode.

11. The system of claim 5 wherein switching the operation mode of the at least one combustion chamber from the first operating mode to the second operating mode corrects spark plug fouling.

12. A method of controlling engine operation, the method comprising:

- operating a combustion chamber in a first operation mode;
- determining a conductivity between a pair of electrodes within the combustion chamber during a period of low ionization; and then
- switching a mode of operating the combustion chamber to a second operation mode if the conductivity between the pair of electrodes during the period of low ionization is indicative of spark plug fouling.

13. The method of claim 12 wherein the first mode of operation is a stratified mode of operation and the second mode of operation is a homogeneous mode of operation.

14. The method of claim 12 further comprising a scavenging period as the period of low ionization is further defined by the presence of mostly fresh air in the combustion chamber.

15. The method of claim 12 further comprising utilizing a pair of spark plug electrodes as the pair of electrodes.

16. The method of claim 12 further comprising switching at least one of an ignition timing, a fuel injection timing, and a fuel mixture.

17. The method of claim 12 further comprising the step of comparing the conductivity to a threshold conductivity and if the conductivity is greater than the threshold conductivity, switching the mode of operating the combustion chamber to correct spark plug fouling.

18. An outboard motor comprising:

- a powerhead having a combustion engine, a midsection configured for mounting the outboard motor to a watercraft, and a lower unit powered by the engine to propel a watercraft,
- the engine having a first electrode and a second electrode operationally disposed within a combustion chamber;
- a computer configured to detect spark plug fouling by placing a voltage across the electrodes and monitoring current that flows between the electrodes within the combustion chamber;
- the computer being further configured to operate the combustion chamber in a first operating mode unless spark plug fouling is detected, wherein if spark plug fouling is detected the computer is configured to operate the combustion chamber in a second operating mode.

19. The outboard motor of claim 18 wherein the computer is further configured to determine a conductivity between the electrodes during a period of low ionization within the combustion chamber.

20. The outboard motor of claim 18 wherein the first operating mode is a stratified operating mode and the second operating mode is a homogeneous operating mode.

21. The outboard motor of claim 18 wherein the first operating mode includes a first ignition timing and the second operating mode includes a second ignition timing.

22. The outboard motor of claim 18 wherein the second operating mode corrects spark plug fouling and minimizes deposits resulting from spark plug fouling.

23. The outboard motor of claim 18 wherein the pair of electrodes is a spark plug.

24. The outboard motor of claim 18 wherein the combustion engine further comprises another combustion chamber and wherein the computer is further configured to cause combustion within the combustion chamber and the another combustion chamber to occur in the first operating mode and the second operating mode independently.

25. A system for determining spark plug fouling comprising:

means for detecting spark plug fouling;

means for cleaning any detected fouling spark plug;

means for changing an operating mode of the combustion chamber if the means for determining spark plug fouling detects a current indicative of spark plug fouling; and means for simultaneously changing an operating mode of another combustion chamber if the means for changing the operating mode of the combustion chamber changes the operating mode of the combustion chamber.

26. The system of claim 25 further comprising a means for detecting combustion chamber ionization.

27. The system of claim 25 wherein the operating mode of the combustion chamber is changed to an operating mode that corrects spark plug fouling.

28. The system of claim 25 wherein the operating mode of the combustion chamber is changed to a homogeneous operating mode and the operating mode of the another combustion chamber is changed to a stratified operating mode.

29. The system of claim 25 further comprising a means for determining spark plug fouling by detecting if a current induced across the pair of electrodes is indicative of spark plug fouling.

* * * * *